United States Patent
Wood et al.

(10) Patent No.: US 10,067,945 B2
(45) Date of Patent: Sep. 4, 2018

(54) FILE AND MOVE DATA TO SHRINK DATAFILES

(71) Applicant: QUEST SOFTWARE INC., Aliso Viejo, CA (US)

(72) Inventors: Daniel T. Wood, Irvine, CA (US); Jacques R. Kilchoer, Irvine, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 304 days.

(21) Appl. No.: 14/629,583

(22) Filed: Feb. 24, 2015

(65) Prior Publication Data

US 2016/0246808 A1    Aug. 25, 2016

(51) Int. Cl.
*G06F 3/06* (2006.01)
*G06F 17/30* (2006.01)

(52) U.S. Cl.
CPC ...... *G06F 17/30135* (2013.01); *G06F 3/0608* (2013.01)

(58) Field of Classification Search
CPC ...... G06F 3/061; G06F 3/0644; G06F 3/0652; G06F 17/30135; G06F 3/0608; G06F 17/30138
See application file for complete search history.

(56) References Cited

U.S. PATENT DOCUMENTS

| | | | | |
|---|---|---|---|---|
| 6,249,792 | B1* | 6/2001 | Zwilling | G06F 17/30115 |
| 8,904,137 | B1* | 12/2014 | Zhang | G06F 17/30135 |
| | | | | 711/165 |
| 2007/0016721 | A1* | 1/2007 | Gay | G06F 12/0246 |
| | | | | 711/103 |
| 2007/0043924 | A1* | 2/2007 | Ito | G06F 3/0613 |
| | | | | 711/170 |
| 2007/0143563 | A1* | 6/2007 | Pudipeddi | G06F 3/0607 |
| | | | | 711/173 |
| 2011/0153972 | A1* | 6/2011 | LaBerge | G06F 3/061 |
| | | | | 711/165 |
| 2013/0041927 | A1* | 2/2013 | Song | G06F 3/0608 |
| | | | | 707/813 |

* cited by examiner

*Primary Examiner* — Jorge A Casanova
(74) *Attorney, Agent, or Firm* — Maschoff Brennan

(57) ABSTRACT

A system, method, and computer-readable medium for consolidating all the currently used areas to the beginning of the datafile by performing a datafile reorganization operation. With this consolidation, more space can be recovered from the datafile. More specifically, with the consolidation, because each used area can contain extents related to several different segments, locating all the segments that have extents in a used area and relocate these segments to lower addresses in the datafile can be challenging.

20 Claims, 3 Drawing Sheets

FILE AND MOVE DATA TO SHRINK DATAFILES

BACKGROUND OF THE INVENTION

Field of the Invention

The present invention relates to information handling systems. More specifically, embodiments of the invention relate to operations to shrink datafiles.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with operating systems. It is also known to provide an operating system with a datafile file structure that is used by a software application. These file structures may contain unused areas that can consume unnecessary space. Over time, a datafile can contain unused areas mixed in with used areas. FIG. 1A, labeled Prior Art, shows a block diagram of an example of a datafile. The datafile includes a datafile header portion 110, datafile used area portions 120, datafile unused (but previously used) area portions 130 and a datafile formatted (but never used portion) 140

One type of application which uses datafiles is a database application. In a database application, logical data structures (named datafiles), such as tables and indexes, are stored in physical files on disk. Datafiles can contain areas that are currently used, areas previously used and currently unused and areas that were never used. The never used area of a datafile is usually found at the end of the datafile. The database application will often use space starting from the beginning of the file and moving towards the end. Inside these datafiles, the logical data structures (tables, indexes, LOBs, etc.) are stored in data blocks. Contiguous data blocks (i.e., segments) associated to the same data structure form an extent. All extents allocated for a database object form what is called the segment. Each segment can contain multiple extents that are spread out in non-contiguous areas of one or more datafiles.

It is known to resize a datafile to allocate more space to it, or to reduce the amount of space the file can take on disk. Increasing the size of a datafile requires more disk space at the operating system level but is a relatively simple operation. Most database applications allow reducing the size of a datafile as long as the reducing operation does not attempt to remove areas that are currently used. To do this, knowledge of the physical location of the last used area in the datafile is needed. When the location of the last used extent is identified, (e.g., via line 150) the datafile can be resized to that point. FIG. 1B, labeled Prior Art, shows a block diagram of an example of the result of such a size reduction operation.

SUMMARY OF THE INVENTION

In accordance with the present invention, a system, method, and computer-readable medium are disclosed for consolidating all the currently used areas to the beginning of the datafile by performing a datafile reorganization operation. With this consolidation, more space can be recovered from the datafile. More specifically, with the consolidation, because each used area can contain extents related to several different segments, locating all the segments that have extents in a used area and relocate these segments to lower addresses in the datafile can be challenging. Additionally, all the extents in the used area are moved while the logical object (table, index) is being used, without affecting the applications using these objects.

More specifically, the datafile reorganization operation identifies segments that own all the extents at higher addresses in the datafile via both direct and indirect inspection. These are the extents that will be moved during the datafile reorganization. Once the segments are identified, the segments are copied by the datafile reorganization operation. Copying the segments causes new extents with the same data to be created at lower addresses in the datafile. Once the copying is complete, the original segments are deleted. This releases the original extents at higher addresses in the datafile. The net outcome is a datafile with all of the data consolidated at lower addresses. Once the original extents are released, the datafile reorganization operation proceeds with a shrink operation. Performing such a datafile reorganization operation reduces the datafile to a size smaller than what was previously thought possible.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
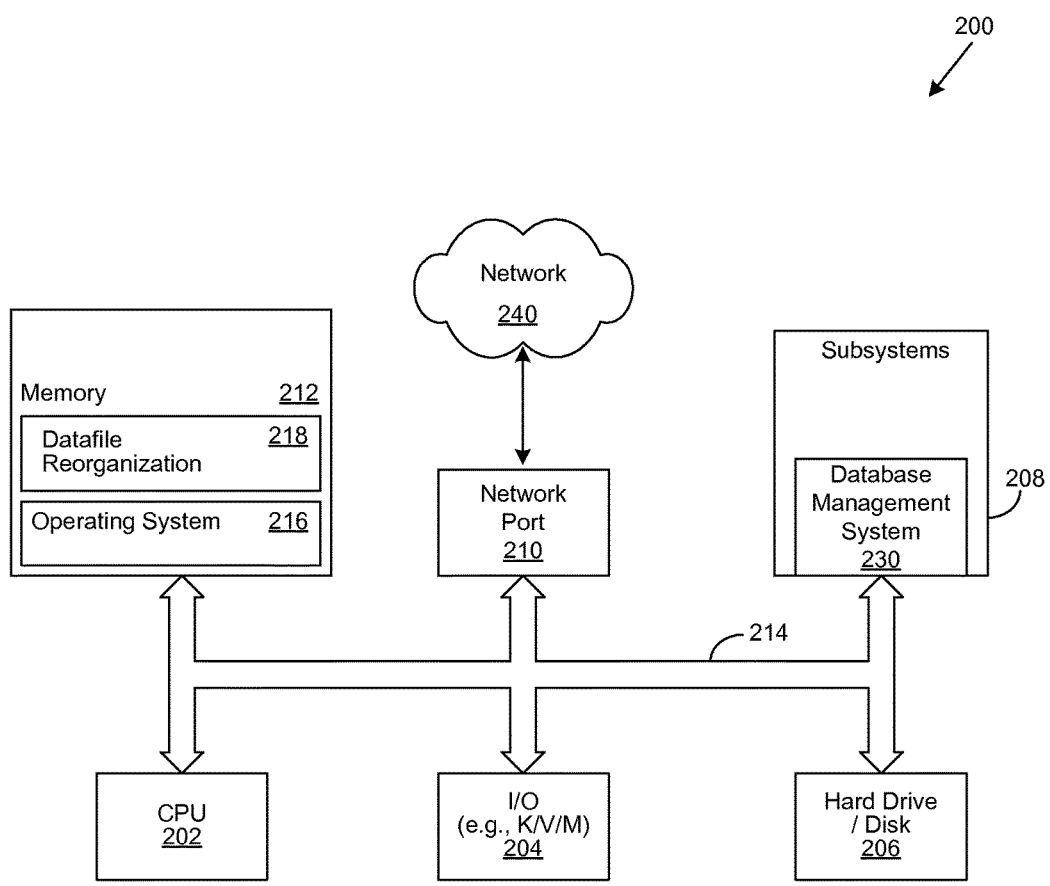
FIG. 2 shows a general illustration of components of an information handling system as implemented in the system and method of the present invention.

FIG. 2 is a generalized illustration of an information handling system 200 that can be used to implement the system and method of the present invention. In various embodiments, the information handling system 200 may correspond to a server type information handling system as well as a database server type information handling system.

The information handling system 200 includes a processor (e.g., central processor unit or "CPU") 202, input/output (I/O) devices 204, such as a display, a keyboard, a mouse, and associated controllers, a hard drive or disk storage 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214.

System memory 212 further comprises operating system (OS) 216 and in various embodiments may also comprise a datafile reorganization module 218. Additionally, in certain embodiments, the subsystems 208 may comprise a database management system 230. Also, in certain embodiments, the datafile reorganization module 218 may be stored within the database management system 230.

The datafile reorganization module 218 consolidates all the currently used areas to the beginning of the datafile by performing a datafile reorganization operation. With this consolidation, more space can be recovered from the datafile.

More specifically, with the consolidation, because each used area can contain extents related to several different segments, locating all the segments that have extents in a used area and relocating these segments to lower addresses in the datafile can be challenging. Additionally, all the extents in the used area need to be moved while the logical object (table, index) is being used, without affecting the applications using these objects. This also presents a challenge. To overcome this challenge, a datafile reorganization is accomplished by means of a series of segment reorganizations. Segment reorganizations are executed in three phases. The first phase is to create a complete copy of the original segment. However during the time it takes to create the copy additional changes may be applied by user or application processes. While the copy is executing, a list of all the records that were modified (added, deleted, or changed) is saved in the original segment. In the second phase, to preserve the fidelity of the copied segment the stored changes are applied to the new segment. This step is repeated until the original and copied segments are perfectly synchronized. Once synchronization is complete, the two segments are swapped in a third and final phase.

Figure 3:
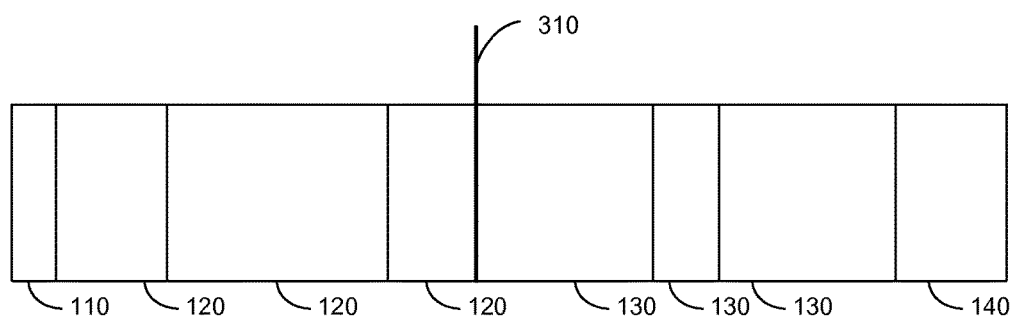
FIG. 3 shows a block diagram of an example of the result of a size reduction operation using a datafile reorganization operation.

Referring to FIG. 3 a block diagram of an example illustrating the result of a size reduction operation using a datafile reorganization operation is shown. More specifically, the datafile reorganization operation begins by identifying a location of the last used extent, as indicated by line 150 in the datafile shown in FIG. 1B. After identifying the location of the last used extent, the datafile reorganization operation identifies segments that own all the extents that are located after line 310 in FIG. 1B (i.e., the location after all used extents are consolidated) and any of their dependent segments.

Once the segments are identified, the segments are copied by the datafile reorganization operation. Copying the segments causes new extents with the same data to be created at lower addresses in the datafile. Once the copying is complete, the original segments are deleted. This releases the original extents at higher addresses in the datafile. The net outcome is a datafile with all of the used areas 120 consolidated at lower addresses as indicated via line 310. Performing such a datafile reorganization operation reduces the datafile to a size smaller than line 150, which was previously the smallest size to which a datafile could be reduced.

Figure 4:
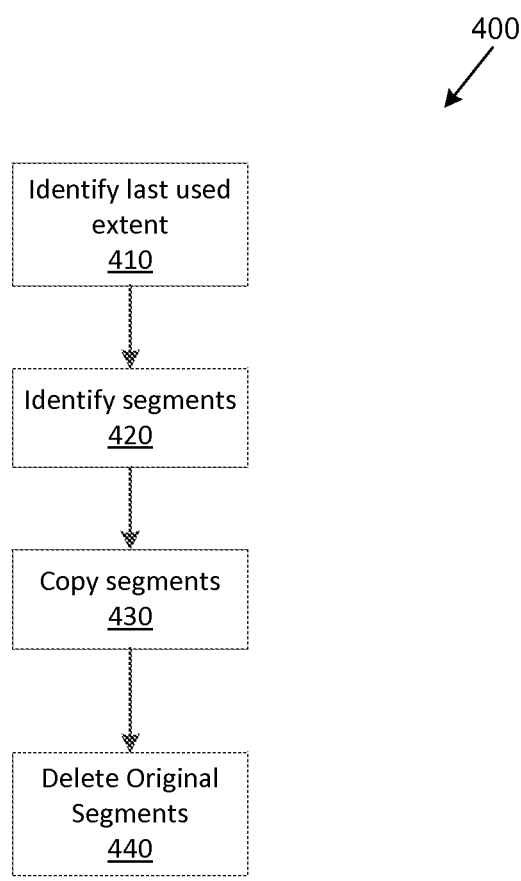
FIG. 4, a flow chart of the operation of a datafile reorganization operation is shown.

Referring to FIG. 4, a flow chart of the operation of a datafile reorganization operation 400 is shown. In certain embodiments, the datafile reorganization operation 400 is performed by the datafile reorganization module 218.

Figure 1A:
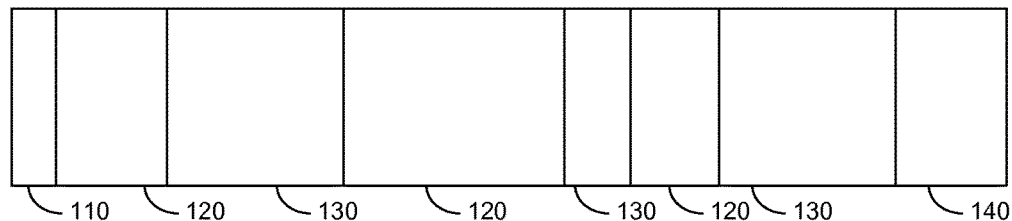
FIGS. 1A and 1B, labeled Prior Art, show a block diagram of an example of a datafile and a block diagram of an example of the result of a size reduction operation, respectively.
Figure 1B:
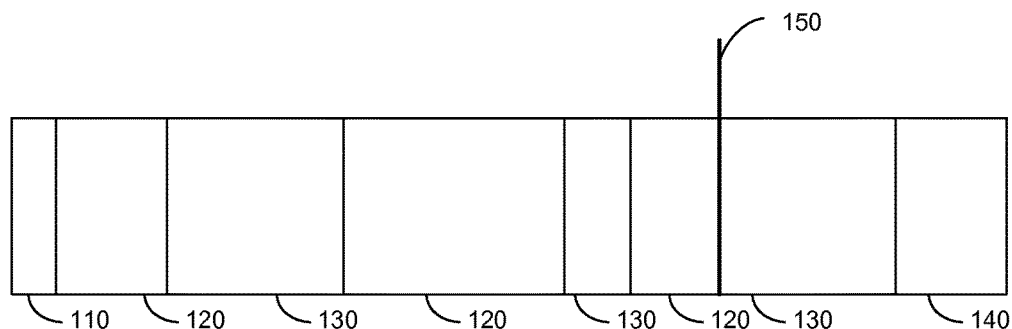

More specifically, the datafile reorganization operation 400 begins by identifying a location of a last used extent as indicated by line 150 in the datafile shown in FIG. 1B, at step 410. This is accomplished by querying the data storage system.

Next, after identifying the location of the last used extent, the datafile reorganization operation identifies segments that own all the extents that are located after line 310 in FIG. 1B (i.e., the location after all used extents are consolidated) at step 420. Locating these extents is accomplished by finding and generating a list of all the extents that need to be moved by querying the storage system. This list contains information that correlates each extent back to the segment to which it belongs. Since each segment can have many extents, the extent to segment correlation is many to one. In most cases segments have dependencies with other segments that may not be the subject of interest. These dependent segments may have 0, 1, or many extents in the datafile being resized. The dependent segments must also be moved even in the case where they have 0 extents in the datafile being resized.

Once the segments are identified, the datafile resize process proceeds to step 430 wherein each segment is moved by means of segment reorganization as previously defined. Reorganizing the segments causes new extents with the same data to be created at lower addresses in the datafile. Once the copying is complete, the original segments are deleted at step 440. This releases the original extents at higher addresses in the datafile.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method, comprising:
    locating segments that have extents in a used area of a datafile, the datafile comprising a datafile header portion, one or more datafile used area portions, one or more datafile unused but previously used area portion, and a datafile formatted portion, each segment containing a plurality of extents spread across non-contiguous areas of at least one datafile; and
    relocating the segments that have extents in a used area to lower addresses in the datafile, the relocating the segments consolidating all unused extents within the datafile, for each segment to be relocated, the relocating the segments comprising:
    creating a copy of the segment;
    while creating the copy of the segment, identifying any changes made to the segment;
    performing the changes to the copy of the segment;
    swapping the segment with the copy of the segment; and
    deleting the segment to release one or more extents at a higher address in the datafile.

2. The method of claim 1, wherein:
    all the extents in the used area are moved while a logical object of the datafile is being used, without affecting the applications using the logical objects.

3. The method of claim 1, wherein the relocating further comprises:
    copying the identified segments such that extents with corresponding data are created at lower addresses in the datafile.

4. The method of claim 3, wherein:
    after the copying is complete, the original segments are deleted so as to release locations corresponding to original extents at higher addresses in the datafile.

5. The method of claim 1, wherein the locating further comprises:
    identifying segments that own all used extents.

6. The method of claim 5, wherein:
    identifying segments that own used extents also identifies unused extents, including extents which were previously used and are above a location of a last used extent, extents which were previously used and are within a location of a last used extent and those that were unused.

7. The method of claim 1, wherein swapping the segment with the copy of the segment comprises:
    removing the segment from a storage location; and
    saving the copy of the segment to the storage location.

8. The method of claim 1, wherein identifying any changes made to the segment comprises identifying at least one of: an addition to, a deletion of at least a portion of, or a modification to the segment.

9. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor to cause a system to perform operations comprising:
locating segments that have extents in a used area of the a datafile, the datafile comprising a datafile header portion, one or more datafile datafile used area portions, one or more datafile datafile unused but previously used area portion and a datafile formatted portion, each segment containing a plurality of extents spread across non-contiguous areas of at least one datafile; and
relocating the segments that have extents in a used area to lower addresses in the datafile, the relocating the segments consolidating all unused extents within the datafile, for each segment to be relocated, the relocating the segments comprising:
creating a copy of the segment;
while creating the copy of the segment, identifying any changes made to the segment;
performing the changes to the copy of the segment;
swapping the segment with the copy of the segment; and
deleting the segment to release one or more extents at a higher address in the datafile.

10. The system of claim 9, wherein:
all the extents in the used area are moved while a logical object of the datafile is being used, without affecting the applications using the logical objects.

11. The system of claim 9, wherein the relocating further comprises:
copying the identified segments such that extents with corresponding data are created at lower addresses in the datafile.

12. The system of claim 11, wherein:
after the copying is complete, the original segments are deleted so as to release locations corresponding to original extents at higher addresses in the datafile.

13. The system of claim 9, wherein the locating further comprises:
identifying segments that own all used extents.

14. The system of claim 13, wherein:
identifying segments that own used extents also identifies unused extents, including extents which were previously used and are above a location of a last used extent, extents which were previously used and are within a location of a last used extent and those that were unused.

15. A non-transitory, computer-readable storage medium embodying computer program code, the computer program code comprising computer executable instructions that, when executed by a processor, cause a system to perform operations comprising:
locating segments that have extents in a used area of a datafile, the datafile comprising a datafile header portion, one or more datafile datafile used area portions, one or more datafile datafile unused but previously used area portion and a datafile formatted portion, each segment containing a plurality of extents spread across non-contiguous areas of at least one datafile; and
relocating the segments that have extents in a used area to lower addresses in the datafile, the relocating the segments consolidating all unused extents within the datafile, for each segment to be relocated, the relocating the segments comprising:
creating a copy of the segment;
while creating the copy of the segment, identifying any changes made to the segment;
performing the changes to the copy of the segment;
swapping the segment with the copy of the segment; and
deleting the segment to release one or more extents at a higher address in the datafile.

16. The non-transitory, computer-readable storage medium of claim 15, wherein:
all the extents in the used area are moved while a logical object of the datafile is being used, without affecting the applications using the logical objects.

17. The non-transitory, computer-readable storage medium of claim 15, wherein the relocating further comprises:
copying the identified segments such that extents with corresponding data are created at lower addresses in the datafile.

18. The non-transitory, computer-readable storage medium of claim 17, wherein:
after the copying is complete, the original segments are deleted so as to release locations corresponding to original extents at higher addresses in the datafile.

19. The non-transitory, computer-readable storage medium of claim 15, wherein the locating further comprises:
identifying segments that own all used extents.

20. The non-transitory, computer-readable storage medium of claim 19, wherein:
identifying segments that own used extents also identifies unused extents, including extents which were previously used and are above a location of a last used extent, extents which were previously used and are within a location of a last used extent and those that were unused.

* * * * *